United States Patent
Zeine

(10) Patent No.: US 9,819,055 B2
(45) Date of Patent: Nov. 14, 2017

(54) ELECTROLYTE AND SULFURIC ACID BATTERY CONTAINING SAME

(71) Applicant: BIGZET INCORPORATED, Wheeling, IL (US)

(72) Inventor: Malik Zeine, Wheeling, IL (US)

(73) Assignee: BIGZET INCORPORATED, Wheeling, IL (US)

( * ) Notice: Subject to any disclaimer, the term of this patent is extended or adjusted under 35 U.S.C. 154(b) by 0 days.

(21) Appl. No.: 14/776,703

(22) PCT Filed: Mar. 14, 2014

(86) PCT No.: PCT/US2014/027394
§ 371 (c)(1),
(2) Date: Sep. 14, 2015

(87) PCT Pub. No.: WO2014/152487
PCT Pub. Date: Sep. 25, 2014

(65) Prior Publication Data
US 2016/0043442 A1 Feb. 11, 2016

Related U.S. Application Data

(60) Provisional application No. 61/784,157, filed on Mar. 14, 2013.

(51) Int. Cl.
*H01M 10/08* (2006.01)
*H01M 10/10* (2006.01)

(52) U.S. Cl.
CPC .......... *H01M 10/08* (2013.01); *H01M 10/10* (2013.01); *H01M 2300/0011* (2013.01); *H01M 2300/0085* (2013.01)

(58) Field of Classification Search
CPC .............. H01M 10/08; H01M 10/10; H01M 2300/0011; H01M 2300/0085; Y02E 60/126; Y02E 60/522
See application file for complete search history.

(56) References Cited

U.S. PATENT DOCUMENTS

| 5,707,756 A | * | 1/1998 | Inoue | H01M 2/1235 429/57 |
| 6,252,035 B1 | * | 6/2001 | McCloskey | C08G 64/307 528/196 |
| 6,372,387 B1 | * | 4/2002 | Kawakami | H01M 10/052 429/188 |
| 7,608,361 B2 | * | 10/2009 | Stauffer | H01M 4/24 252/182.1 |
| 2008/0182933 A1 | | 7/2008 | Shimizu et al. | |

FOREIGN PATENT DOCUMENTS

| CN | 101877419 | * 11/2010 |
| CN | 101877419 A | 11/2010 |

OTHER PUBLICATIONS

International Search Report and Written Opinion, International Application No. PCT/US14/27394, dated Jul. 24, 2014.
International Preliminary Report on Patentability, International Application No. PCT/US2014/027394, dated Sep. 15, 2015.

* cited by examiner

*Primary Examiner* — Brittany Raymond
(74) *Attorney, Agent, or Firm* — Marshall, Gerstein & Borun LLP

(57) ABSTRACT

The invention provides sulfuric acid efficiency electrolytes including a surfactant, preferably an amphoteric or a non-ionic surfactant, and/or phosphoric acid, the sulfuric acid efficiency electrolyte preferably further including at least one of a chelating agent and a crystal growth regulator, and optionally, a filler. The invention further provides sulfuric acid electrolytes including a filler, at least one chelating agent, and at least one water-soluble sulfate salt, wherein the chelating agent comprises an alkali metallated chelating agent and the water-soluble sulfate salt comprises the corresponding cation to the cation present in the alkali metallated chelating agent. The invention further provides lead sulfuric acid batteries including a positive electrode, negative electrode, and the efficiency electrolyte of the invention disposed therebetween.

14 Claims, No Drawings

ELECTROLYTE AND SULFURIC ACID BATTERY CONTAINING SAME

FIELD OF THE INVENTION

The invention relates generally to efficiency electrolytes and lead sulfuric acid batteries comprising efficiency electrolytes. More particularly, the invention relates to an efficiency sulfuric acid electrolyte including a surfactant, preferably an amphoteric or a non-ionic surfactant, the sulfuric acid efficiency electrolyte preferably further comprising at least one of a chelating agent and a crystal growth regulator, and lead sulfuric acid batteries including a positive electrode, a negative electrode, and the efficiency electrolyte.

BRIEF DESCRIPTION OF RELATED TECHNOLOGY

Recent research in the field of lead sulfuric acid electrolyte batteries (LEB) has been directed to increasing the energy density per cubic centimeter (Watt hour/cm$^3$ (Wh/cm$^3$)), power per kilogram (W/kg), and the capacity of the battery (Ampere hour (Ah)), to increase the number of full charge-discharge cycles of the battery and to decrease current leakage. Recent research in the field of capacitors has similarly been directed to increasing the capacity (Ah) of the capacitor.

SUMMARY

The invention provides a sulfuric acid efficiency electrolyte, including sulfuric acid and a surfactant, preferably an amphoteric surfactant or a non-ionic surfactant, the sulfuric acid efficiency electrolyte preferably further including at least one of a chelating agent and a crystal growth regulator. Optionally, the electrolyte can further comprise a filler. Advantageously, the sulfuric acid efficiency electrolyte according to the invention can be used in both batteries, including but not limited to lead acid batteries, alkaline batteries, and lithium batteries, and capacitors.

In a related aspect, the invention provides a sulfuric acid efficiency electrolyte, including sulfuric acid and phosphoric acid, the sulfuric acid efficiency electrolyte preferably further comprising at least one of a chelating agent and a crystal growth regulator. Optionally, the electrolyte can further comprise a filler. Advantageously, the sulfuric acid efficiency electrolyte according to the invention can be used in both batteries and capacitors.

In a related aspect, the invention provides a sulfuric acid efficiency electrolyte including sulfuric acid, a filler, at least one chelating agent, and at least one water-soluble sulfate salt. Preferably, the chelating agent comprises an alkali metallated chelating agent and the sulfate comprises the corresponding cation to the alkali metallated chelating agent. Optionally, the electrolyte can further comprise a surfactant, phosphoric acid, and/or a crystal growth regulator.

In a related aspect, the invention provides a lead sulfuric acid battery with a sulfuric acid efficiency electrolyte, including a positive electrode, a negative electrode, and an electrolyte disposed between the positive electrode and the negative electrode, wherein the electrolyte includes sulfuric acid and a surfactant, preferably an amphoteric surfactant or a non-ionic surfactant, the sulfuric acid efficiency electrolyte preferably further including at least one of a chelating agent and a crystal growth regulator. Optionally, the electrolyte can further comprise a filler.

In a further related aspect, the invention provides a lead sulfuric acid battery with a sulfuric acid efficiency electrolyte, including a positive electrode, a negative electrode, and an electrolyte disposed between the positive electrode and the negative electrode, wherein the electrolyte includes sulfuric acid and phosphoric acid, the sulfuric acid efficiency electrolyte preferably further comprising at least one of a chelating agent and a crystal growth regulator. Optionally, the electrolyte can further comprise a filler.

In one aspect of the invention, the method of preparing an efficiency electrolyte, includes the steps of combining water and sulfuric acid, thereby forming a sulfuric acid solution; preparing an additive solution by combining a surfactant, preferably an amphoteric surfactant or a non-ionic surfactant, and preferably one of a crystal growth regulator and a chelating agent with a carrier solvent, and adding the additive solution to the sulfuric acid solution, thereby forming the efficiency electrolyte. Optionally, the additive solution further includes a filler. In certain aspects, the efficiency electrolyte solution can include sufficient quantities of filler such that the electrolyte solution can gellify or solidify and be used in a battery or a capacitor in solid form.

In a related aspect of the invention, the method of preparing an efficiency electrolyte, includes the steps of combining water, sulfuric acid, and phosphoric acid thereby forming a sulfuric acid solution, preparing an additive solution by combining preferably at least one of a crystal growth regulator and a chelating agent with a carrier solvent, and adding the additive solution to the sulfuric acid solution, thereby forming an efficiency electrolyte. Optionally, the additive solution further includes a filler. In certain aspects, the efficiency electrolyte solution can include sufficient quantities of filler such that the electrolyte solution can gellify or solidify and be used in a battery or a capacitor in solid form.

Further aspects of the invention may become apparent to those skilled in the art from a review of the following detailed description, taken in conjunction with the appended claims. While the invention is susceptible of embodiments in various forms, described hereinafter are specific embodiments of the invention with the understanding that the disclosure is illustrative, and is not intended to limit the invention to specific embodiments described herein.

DETAILED DESCRIPTION

The invention provides a sulfuric acid efficiency electrolyte, including a surfactant, preferably an amphoteric surfactant or a non-ionic surfactant, and the sulfuric acid efficiency electrolyte preferably further comprises at least one of a chelating agent and a crystal growth regulator. Optionally, the electrolyte can further comprise a filler. Advantageously, the efficiency electrolyte according to the invention can be used in both batteries and capacitors.

In a related aspect, the invention further provides a sulfuric acid efficiency electrolyte, including sulfuric acid and phosphoric acid, the sulfuric acid efficiency electrolyte preferably further comprising at least one of a chelating agent and a crystal growth regulator. Optionally, the electrolyte can further comprise a filler. Advantageously, the efficiency electrolyte according to the invention can be used in both batteries and capacitors.

In a related aspect, the invention provides a sulfuric acid efficiency electrolyte including sulfuric acid, a filler, at least one chelating agent, and at least one water-soluble sulfate salt. Preferably, the chelating agent comprises an alkali metallated chelating agent and the water-soluble sulfate salt comprises the corresponding cation to the alkali metallated chelating agent. Optionally, the electrolyte can further comprise a surfactant, phosphoric acid, and/or a crystal growth regulator. In certain aspects, the chelating agent can comprise at least one of ethylenediaminetetraacetic acid (EDTA), the lithium EDTA salt, the potassium EDTA salt, the sodium EDTA salt, and combinations of the foregoing. In further aspects the sulfate salt can further comprise at least one lithium sulfate, potassium sulfate, sodium sulfate, and combinations of the foregoing, wherein the metal cations of the sulfate salt(s) corresponds to the cation(s) of any EDTA salts included in the electrolyte.

In a related aspect, the invention provides a lead sulfuric acid battery with an efficiency electrolyte, including a positive electrode, a negative electrode, and an electrolyte disposed between the positive electrode and the negative electrode, wherein the electrolyte comprises a surfactant, preferably an amphoteric surfactant or a non-ionic surfactant, and the sulfuric acid efficiency sulfuric acid electrolyte preferably further comprises at least one of a chelating agent and a crystal growth regulator. Optionally, the electrolyte can further comprise a filler.

In a further related aspect, the invention provides a lead sulfuric acid battery with a sulfuric acid efficiency electrolyte, including a positive electrode, a negative electrode, and an electrolyte disposed between the positive electrode and the negative electrode, wherein the electrolyte includes sulfuric acid and phosphoric acid, the sulfuric acid efficiency electrolyte preferably further comprising at least one of a chelating agent and a crystal growth regulator. Optionally, the electrolyte can further comprise a filler.

In one aspect of the invention, the method of preparing an efficiency electrolyte, includes the steps of combining water and sulfuric acid, thereby forming a sulfuric acid solution; preparing an additive solution by combining a surfactant, wherein the surfactant is preferably an amphoteric surfactant and a non-ionic surfactant, and preferably at least one of a crystal growth regulator and a chelating agent with a carrier solvent; and adding the additive solution to the sulfuric acid solution, thereby forming the efficiency electrolyte. Optionally, the additive solution further includes a filler. In certain aspects, the efficiency electrolyte solution can include sufficient quantities of filler such that the electrolyte solution can gellify or solidify and be used in a battery or a capacitor in solid form.

In a related aspect of the invention, the method of preparing an efficiency electrolyte, includes the steps of combining water, sulfuric acid, and phosphoric acid thereby forming a sulfuric acid solution, preparing an additive solution by combining preferably at least one of a crystal growth regulator and a chelating agent with a carrier solvent, and adding the additive solution to the sulfuric acid solution, thereby forming an efficiency electrolyte. Optionally, the additive solution further includes a filler. In certain aspects, the efficiency electrolyte solution can include sufficient quantities of filler such that the electrolyte solution can gellify or solidify and be used in a battery or a capacitor in solid form.

The sulfuric acid efficiency electrolytes of the invention are particularly advantageous as the electrolyte can sustain voltages of about 12.7-13 volts for a duration of about 24 hours to about 6 months. Further, the sulfuric acid efficiency electrolytes of the invention can advantageously operate within temperatures from about −60 to about 60° C. Further still, as demonstrated in the examples, lead sulfuric acid batteries including the sulfuric acid efficiency electrolyte, advantageously demonstrate an increased capacity and energy over a lead sulfuric acid battery that contains only the sulfuric acid. The lead sulfuric acid batteries of the invention that include the sulfuric acid efficiency electrolyte advantageously prevents the sulfation of the electrodes, which allows the batteries to operate in short time or long time regimes, as well as in partial charge-discharge or full charge-discharge regimes. Further, the efficiency electrolytes of the invention are advantageous because they have little to no oxygen or hydrogen gas emission, and also have low electrical resistivity. Further still, as demonstrated in the examples, the efficiency electrolytes of the invention are advantageous because they can be used to revive spent batteries (i.e., batteries that are no longer useable for intended function).

Ranges may be expressed herein as from "about" or "approximately" one particular value and/or to "about" or "approximately" another particular value. When such a range is expressed, another embodiment according to the invention includes from the one particular value and/or to the other particular value. Similarly, when particular values are expressed as approximations, but use of antecedents such as "about," "at least about," or "less than about," it will be understood that the particular value forms another embodiment.

In general, the sulfuric acid efficiency electrolytes of the invention are liquids. As described below, in some embodiments the efficiency electrolyte can gellify or solidify and be used in solid form in a battery or a capacitor. The efficiency electrolyte includes sulfuric acid in an amount suitable to maintain/provide a density of about 1.2 g/cm$^3$ to about 1.4 g/cm$^3$, for example, about 1.2 g/cm$^3$, about 1.22 g/cm$^3$, about 1.24 g/cm$^3$, about 1.26 g/cm$^3$, about 1.28 g/cm$^3$, about 1.3 g/cm$^3$, about 1.32 g/cm$^3$, about 1.34 g/cm$^3$, about 1.36 g/cm$^3$, about 1.38 g/cm$^3$, or about 1.4 g/cm$^3$, at 25° C. For example, the efficiency electrolyte can include sulfuric acid in an amount of about 20% to about 50% by volume, for example, about 25% to about 50%, about 25% to about 45%, about 30% to about 45%, about 30% to about 40%, and/or about 35% by volume. The electrolyte solvent can be any solvent that is capable of serving as a carrier for the sulfuric acid, chelating agent, surfactant, crystal growth regulator and optional components such as a filler. For example, the electrolyte solutions described herein can comprise aqueous solutions, and/or other solvents including but not limited to, amines, alcohols, diols, ethers, and combinations of the foregoing. When the term "solution" is used herein, it is not necessary that the components contained therein completely dissolve. Thus, as used herein, the term solution encompasses both dispersions in which components are dispersed and solutions in which components are substantially or even completely dissolved.

During the charge-discharge cycle of a sulfuric acid battery, the pH of the electrolyte solution will change from acidic to alkaline. When charged, the sulfuric acid electrolyte is acidic (pH<7) and contains free sulfate (i.e., dissociated sulfuric acid). After discharge, the sulfuric acid electrolyte is alkaline (pH>7) and the sulfate is in the form of lead sulfate ($PbSO_4$) on the electrodes. When the battery is re-charged some of the sulfate anion returns to the electrolyte solution. Ideally, most to all of the sulfate returns to the electrolyte solution. Build up of the sulfate anion on the electrodes is referred to as sulfation. Sulfation is often a cause of failure of lead acid batteries that include sulfuric acid in the electrolyte. Further, because the charge-discharge cycle of the battery requires the sulfate to exchange between the electrolyte solution and the electrodes, it is believed that any metal or salt present in the electrolyte that interacts with and/or leads to precipitation of the sulfate anion, will interfere with the charge-discharge cycle of the battery, resulting in shorter battery life, less full charge-discharge cycles, and lower voltage during the discharge. For example, the presence of aluminum salts in the electrolyte lead to the precipitation of $Al_2(SO_4)_3$, thereby removing some of the sulfate anions from the electrolyte solution. Such a reduction in the amount of sulfate anions will result in less sulfate anions available to exchange between free sulfate and $PbSO_4$, thereby lowering the actual voltage of the battery. Sulfate anions that are maintained in the solution and are available for participation in the charge-discharge cycle are referred to as active sulfate. Sulfate anions that have formed a complex with metal cations and precipitated out of the electrolyte solution are no longer available for the charge-discharge cycle and are referred to as inactive sulfate. As demonstrated in the examples below, when a metal cation is present in the electrolyte (Examples 3 and 4) a decrease in energy and capacity of the battery compared to batteries that include an identical electrolyte except for the presence of the metal cation (and corresponding counter anion) (Examples 2) is observed. It is theorized that the presence of the metal cation(s) leads to inactive sulfate, and detrimentally affects battery performance. Therefore it is desirable to minimize the amount of metal cation that can form insoluble precipitates in the electrolyte.

Chelating agents can be included in the electrolyte to bind, for example, the lead cations of the electrode (or other metal cations introduced into the electrolyte), allowing the cations to be in a suspended condition. For example, when complexed to a chelating agent, the lead cation will not precipitate out of solution with the sulfate. Therefore the inclusion of a chelating agent mitigates the formation of inactive sulfate. Further, the presence of the chelating agent also reduces sulfation of the electrodes by maintaining lead and other metals in suspended form, preventing $PbSO_4$ from depositing on the electrodes. Suitable chelating agents can include, but are not limited to, ethylenediaminetetraacetic acid (EDTA), and alkali metallated chelating agents, including but not limited to EDTA salts such as the calcium, lithium, potassium, aluminum, titanium, or selenium salts, and combinations of the foregoing. The chelating agent can be included in the electrolyte solution in an amount in a range of about 1 g to about 6 g of chelating agent per L of electrolyte solution, for example, about 1 g, about 5 g, about 1 g, about 3 g, about 1 g, about 2 g, and/or about 1.5 g per L of electrolyte solution. In embodiments comprising EDTA, preferably the acid form is used in order to minimize the amount of metal cations introduced into the electrolyte solution. In some embodiments of the invention, the acid form of EDTA can be used alone or in combination with the sodium, calcium, lithium, potassium, aluminum, titanium, or selenium salt thereof. However, the salt forms are less suitable because the formation of $SO_4$ salts, may lead to the precipitation of the sulfate anion from the electrolyte solution. However, without intending to be bound by theory, it is believed that the presence of particular alkali EDTA salts can also provide advantages to the electrolyte solution. For example, it is believed that the presence of $Na_2EDTA$ decreases current leakage, $Li_2EDTA$ increase battery capacity, and $K_2EDTA$ increase and hold voltage on the electrodes. Thus, when the chelating agent comprises the lithium, potassium, calcium, aluminum, titanium, selenium or sodium salt of a chelating agent, the amount of chelating agent is controlled to limit the amount of the cation in the electrolyte solution.

In general, the amount of metal cation in the electrolyte solution is no more than about 0.15 mol per L of electrolyte solution. However, the presence of metal cations in the electrolyte solution can affect the electrical resistivity of the electrolyte solution, therefore the specific maximum amount of metal cation that can be included in the electrolyte will vary depending on the cation and can be easily determined by one of ordinary skill in the art. For example, in embodiments wherein the chelating agent consists of a lithium salt, the total amount of lithium included in the electrolyte is in a range of about 0.001 to about 0.15 mol/L. In embodiments wherein the chelating agent consists of a potassium salt, the total amount of potassium included in the electrolyte is in a range of about 0.001 to about 0.05 mol/L. In embodiments wherein the chelating agent consists of a sodium salt, the total amount of sodium included in the electrolyte is in a range of about 0.001 to about 0.06 mol/L, or about 0.025 to about 0.05 mol/L. The EDTA salts can be used individually or in combination. In embodiments wherein EDTA salts are used in combination, any combination and ratio can be used, provided the total amount of each cation is provided within the aforementioned ranges. For example, in newer batteries lithium, potassium and sodium salts can be present in any ratio, for example 1:1:1, 2:1:1, 2:2:1, 2:3:1, and or 3:2:1, respectively. In alternative embodiments wherein the battery is a used or spent battery, the sodium salt of EDTA can be left out of the electrolyte solution, and lithium and potassium salts can be present in a 2:3 ratio, for example.

Without intending to be bound by theory, it is believed that because $SO_4$ salts, formed from the cations provided as EDTA salts, may precipitate from the electrolyte solution, the corresponding $SO_4$ salt should be added to the electrolyte solution, to replace the active $SO_4$ ions that may have precipitated, when EDTA salts are included, thereby decreasing current leakage and supporting the voltage. For example, if an electrolyte solution comprises the lithium salt of EDTA, the water-soluble salt comprising the corresponding cation, lithium sulfate, should also be included in the electrolyte solution. In embodiments wherein sulfate salts are used in combination, the combination and ratio will mirror that of the EDTA salts used, and the total amount of each cation will be within the aforementioned ranges. For example, in newer batteries lithium, potassium and sodium sulfates will mirror the ratio or EDTA salts, present in any ratio, for example 1:1:1, 2:1:1, 2:2:1, 2:3:1, and or 3:2:1, respectively. In alternative embodiments wherein the battery is a used or spent battery, the sodium salt of EDTA can be left out of the electrolyte solution, and thus sodium sulfate can also be left out of the electrolyte solution. In such an embodiment lithium and potassium cations can be present in the electrolyte solution in a ratio of about 2:3, for example.

Further, it is believed that the formation of lead deposits on the electrodes can lead to failure of lead acid batteries. Without intending to be bound by theory, it is believed that in commercial lead sulfuric acid batteries, not according to the invention, after a first (or subsequent) discharge (i.e. after the formation of $PbSO_4$ on the electrodes), the lead cations may not become suspended into the electrolyte during re-charging of the battery, but rather crystallize on the electrodes forming deposits, resulting in the lead being unavailable to form further $PbSO_4$ compounds during subsequent discharge cycles. As a result, the actual voltage of the battery decreases. It is further believed that in batteries comprising the electrolyte of the invention, the chelating agent advantageously chelates to the lead cation during charging of the battery as the sulfate anion returns to the electrolyte, thereby aiding in the suspension of the lead cation in the electrolyte and preventing the crystallization of the lead cation on an electrode.

In embodiments of the application, the chelating agent may not be stable on its own in acidic medium. For example, EDTA is known to decompose in acidic solutions. It has been advantageously found that the stability of the chelating agent in the electrolytes of the invention can be improved by including a surfactant in the electrolyte. In one class of embodiments, at least the chelating and surfactant are premixed before introducing the chelating agent to a solution of sulfuric acid. Further, it is believed that the inclusion of a surfactant in an electrolyte of the invention aids in protecting the electrodes from sulfation and/or formation of lead deposits.

The surfactant of the invention can be any surfactant that can protect the chelating agent from the acidic medium while the battery is charged and also aid in preventing sulfation and/or formation of lead deposits at the electrodes. In one class of embodiments, the surfactant is an amphoteric surfactant that works well in alkali and acidic medium. In an alternative class of embodiments the surfactant is a non-ionic surfactant. Non-ionic surfactants, however, may lead to a decrease in the capacity of the battery because non-ionic surfactants may form thin film on the electrodes. The surfactant can be included in the electrolyte in an amount in a range of about 1 mL to about 25 mL surfactant per L of electrolyte, for example, about 1 mL to about 20 mL, about 5 mL to about 25 mL, about 5 mL to about 20 mL, about 5 mL to about 15 mL, about 5 mL to about 10 mL, about 6 mL, about 7 mL, about 8 mL, about 9 mL, and/or about 9.5 mL. The surfactant can be included in the electrolyte in an amount in a range of about 0.1 g to about 0.5 g per L of electrolyte, for example, about 0.1 g to about 0.4 g, about 0.2 g to about 0.3 g, about 0.1 g, about 0.15 g, about 0.2 g, about 0.25 g, about 0.3 g, about 0.35 g, about 0.4 g, about 0.45 g, and/or about 0.5 g.

Amphoteric surfactants have both cationic and anionic groups and, therefore, will be soluble over a wide pH range. Suitable amphoteric surfactants include, but are not limited to, betaine derivatives, such as cocamidopropyl betaine, lecithin, alkyl iminodiproprionates, alkyl imidazolines, and alkyl polyaminocarboxylates. Lecithin is a generic term to designate any surfactant composed of phosphoric acid, choline, fatty acids, glycerol, glycolipids, triglycerides, and phospholipids. Lecithin can include, for example, phosphatidylcholine, phosphatidylethanolamine, phosphatidylinositol, and combinations of the foregoing. Commercial lecithin, derived from soybeans and containing a carrier of soybean oil, is the principal lecithin, although it may also be obtained from other vegetable and animal sources, such as corn oil, safflower oil, or egg yolk.

Non-ionic surfactants are surfactants that do not produce ions in aqueous solution. Suitable non-ionic surfactants include, but are not limited to, fatty alcohols such as cetyl alcohol, stearyl alcohol, cetosterayl alcohol, and oleyl alcohol, ethoxylated linear alcohols, ethoxylated alkyl phenols, fatty acid esters, polyoxyethylene glycol alkyl ethers such as octaethylene glycol monododecyl ether, and pentaethylene glycol monododecyl ether, polyoxypropylene glycol alkyl ethers, glucoside alkyl ethers such as decyl glucoside, lauryl glucoside, and octyl glucoside, polyoxyethylene glycol octylphenol ethers, polyoxyethylene glycol alkylphenyl ethers, glycerol alkyl esters such as glyceryl laurate, polyoxyethylene glycol sorbitan alkyl esters such as polysorbate, sorbitan alkyl esters, dodecyldimethylamine oxide, polyethylene glycol octylphenyl ether, poly(ethylene oxide), polyethoxylated tallow amine, and combinations of the foregoing.

Alternatively, phosphoric acid can be included in the efficiency electrolyte in place of a surfactant. It is believed that the phosphoric acid can function in the same way as the surfactant with respect to providing a level of protection to the electrodes from sulfation and lead deposit formation. "Phosphoric acid" as used herein refers to orthophosphoric acid, pyrophosphoric acid, triphosphoric acid, and combinations thereof. In embodiments including phosphoric acid, the phosphoric acid can be included in the electrolyte in an amount in a range of about 0.5 to about 3% by volume, based on the total electrolyte volume. For example, phosphoric acid can be included in the electrolyte in an amount of about 1 mL to about 30 mL, for example, about 1 mL to about 30 mL, about 2.5 mL to about 25 mL, about 5 mL to about 20 mL, about 5 mL to about 15 mL, about 5 mL to about 10 mL, about 6 mL, about 7 mL, about 8 mL, about 9 mL, and/or about 9.5 mL.

The sulfuric acid efficiency electrolyte of the invention can further include a crystal growth regulator. The crystal growth regulator is a compound that when added to the electrolyte solution inhibits crystallization and lead deposit formation on the electrodes of a battery that has the electrolyte solution therein. Suitable crystal growth regulators for use in the electrolytes of the invention include, but are not limited to, 1,4-butanediol, thiourea, propylene glycol, and combinations of the foregoing.

The crystal growth regulator, together with the surfactant, also functions to prevent water loss from an efficiency electrolyte solution, and the battery containing the efficiency electrolyte solution during charging or discharging of the battery. The crystal growth regulator and surfactant form a thin layer on the surface of the electrolyte solution, thereby preventing evaporation. The amount of crystal growth regulator included in an electrolyte depends, in part, on the type of surfactant included in the electrolyte. A surfactant that foams in the electrolyte solution may not be able to effectively inhibit crystallization and lead deposit formation on the electrode. Thus, in embodiments wherein the surfactant is a foaming surfactant a crystal growth regulator is preferably included. Alternatively, in embodiments wherein the surfactant does not foam, the surfactant is available to provide protection to the electrodes and a crystal growth regulator is included in an amount suitable to aid the surfactant in preventing evaporation of the electrode. The crystal growth regulator can be included in the electrolyte solution in an amount in a range of about 0.01 to about 1.5 g of crystal growth regulator per L of electrolyte solution, for example, about 0.05 g to about 1.0 g, about 0.1 g to about 0.8 g, about 0.1 g to about 0.5 g, about 0.1 g to about 0.2 g, and/or about 0.2 g.

One aspect of the invention provides a battery including the efficiency electrolyte described herein. Generally, the battery can be any battery that comprises lead electrodes and an acidic electrolyte. Lead-acid batteries are well known in the art. Lead acid batteries for use with the electrolyte of the invention can include, but are not limited to valve regulated lead acid batteries (VRLA) including, but not limited to, sealed VRLA batteries such as absorbed glass mat batteries (AGM) or gel cell batteries.

Optionally, the electrolyte of the invention can further comprise a filling agent to modify the viscosity of the electrolyte. In one class of embodiments, the electrolyte has a viscosity of about 0.001 P to about 0.003 P. When the viscosity of the electrolyte increases above about 0.003 P the electrical resistivity of the electrolyte solution also increases.

The filling agent also acts as a water absorbing agent. Without intending to be bound by theory, it is believed that when present in the electrolyte the filler extends the lifetime of a battery comprising the electrolyte solution of the invention. It is known that over the lifetime of a battery some water may evaporate from an electrolyte solution. It is believed that the filler initially absorbs water from the electrolyte solution, and upon evaporation over the lifetime of the battery, the filler will release water back into the electrolyte solution, automatically, to maintain the amount of water in the electrolyte. It is believed that as a result the battery energy and capacity will be maintained longer than in a battery that has an electrolyte that does not include a water absorbing filler. It is further believed that the filler improves conductivity of the electrolyte.

Suitable filling agents include, but are not limited to $SiO_2$, SiC, polyvinyl alcohol (PVA), bentonite, diatomaceous earth, polyacrylamide, and combinations of the foregoing. When included in an electrolyte, the amount of filling agent can vary depending on the desired viscosity, and the other components included in the electrolyte. When a filler is included in an electrolyte solution, the solution is initially a liquid and easily poured into a battery. The electrolyte over a duration of a few hours can gellify or solidify depending on the amount of filler included in the electrolyte solution. In one class of embodiments the electrolyte solution including a filler will remain a liquid over the life of the battery. In alternative embodiments, the electrolyte solution will gellify or solidify. The filler may be included in the electrolyte solution in an amount in a range of about 0.05 wt % to about 99.9 wt % based on the weight of the total electrolyte solution, for example, about 0.05 wt % to about 50 wt %, or about 0.05 wt % to about 25 wt %, or about 0.05 wt % to about 10 wt %, or about 0.01 wt % to about 5 wt %, or about 0.1 wt % to about 0.8 wt %, for example, between about 0.01 to about 1.0 g/L electrolyte solution, or about 0.1 to about 0.9 g/L, or about 0.2 to about 0.8 g/L, or about 0.3 to about 0.7 g/L, or about 0.4 to about 0.6 g/L, or about 0.5 g/L electrolyte solution. For example, in embodiments wherein the electrolyte solution will gellify or solidify in the presence of the filler, the electrolyte solution may gellify or solidify in about 24 hours or less, for example, in a range of about 12 hours to about 24 hours. The gel and/or solid electrolyte has the advantage of low electrical resistivity as with a liquid electrolyte and a higher ionic conductivity as with a gel or solid electrolyte.

In one aspect of the invention, the method of preparing an efficiency electrolyte, includes the steps of:
(a) combining water and sulfuric acid, thereby forming a sulfuric acid solution;
(b) preparing an additive solution by combining a surfactant wherein the surfactant is preferably selected from an amphoteric surfactant and a non-ionic surfactant, and preferably at least one of a crystal growth regulator and a chelating agent in a carrier solvent; and
(c) adding the additive solution to the sulfuric acid solution, thereby forming an efficiency electrolyte solution.

In a related aspect of the invention, the method of preparing an efficiency electrolyte includes the steps of:
(a) combining water, sulfuric acid, and phosphoric acid thereby forming a sulfuric acid solution;
(b) preparing an additive solution by combining preferably at least one of a crystal growth regulator and a chelating agent with a carrier solvent; and
(c) adding the additive solution to the sulfuric acid solution, thereby forming an efficiency electrolyte solution.

Optionally, the additive solution further includes a soluble inorganic hydroxide, a filler, stabilizer, and/or an oxidizing agent.

The carrier solvent can be any solvent capable of acting as a carrier for the surfactant (if present), chelating agent (if present), crystal growth regulator (if present), and/or filler (if present). The carrier solvent can be an aqueous solution, for example, a basic aqueous solution such as aqueous ammonium hydroxide, KOH, NaOH, $Ca(OH)_2$, LiOH and/or the carrier solvent can be other solvents including but not limited to, amines, alcohols, diols, ethers, and combinations of the foregoing. Of course, if the carrier solvent is an aqueous metal hydroxide solution, the amount of metal cation is controlled such that the total amount of metal cation in solution is less than 0.15 mol per L of electrolyte solution.

The efficiency electrolytes, methods of preparing the electrolyte, and batteries in accordance with the disclosure can be better understood in light of the following examples, which are merely intended to illustrate the efficiency electrolytes and batteries and are not meant to limit the scope thereof in any way.

EXAMPLES

Energy and Capacitance Measurements

The energy and capacity of the batteries comprising the electrolytes of the invention were determined using a Yokogawa Power Analyzer WT/210 (Yokogawa Electric Corporation, Newnan, Ga.). The methods for measuring battery energy and capacitance with a Power Analyzer WT/210 Yokogawa are well known to those in the art.

Example 1

An electrolyte was prepared with the ingredients identified below in the amounts shown.

| Component | Function | Amount |
| --- | --- | --- |
| Distilled water | Solvent | 760 ml |
| $H_2SO_4$ (98% by weight; d = 1.83 g/ml) | Sulfate source | 306 ml |
| EDTA | Chelating agent | 1.5 g |
| Lecithin | Amphoteric surfactant | 0.5 g |

The $H_2SO_4$ was added to the distilled water and was stirred until the solution cooled to room temperature. An aqueous solution (100 ml) of lecithin and EDTA was then added to the $H_2SO_4$ solution, resulting in the electrolyte solution. The electrolyte solution had a density of approximately 1.3 g/cm$^3$, at 25° C.

The electrolyte solution was loaded into an ES5LBS battery according to the invention. The battery energy and capacity were measured. The battery energy was found to be 55.585 Wh, and the capacity was found to be 4.4947 Ah. The performance of the battery was compared to the performance of a commercial ES5LBS battery with an electrolyte comprising 760 mL distilled water and 306 mL $H_2SO_4$ (98% by weight, density=1.84 g/ml) having a published energy of 48 Wh and capacity of 4 Ah (EverStart Premium Power Sport Battery). The battery of Example 1 demonstrated 24.1% more energy and 20.7% more capacity than the commercial ES5LBS battery.

Example 1 demonstrates that a sulfuric acid efficiency electrolyte of the invention results in an increase in the energy and capacitance of a lead-acid battery compared to a battery comprising an electrolyte that does not include any of a chelating agent, a surfactant, or a crystal growth regulator.

Example 2

An electrolyte was prepared with the ingredients identified below in the amounts shown.

| Component | Function | Amount |
| --- | --- | --- |
| Distilled water | Solvent | 760 ml |
| $H_2SO_4$ (98% by weight; d = 1.84 g/ml) | Sulfate source | 306 ml |
| EDTA | Chelating agent | 1.5 g |
| Lecithin | Amphoteric surfactant | 0.5 g |
| 1,4-Butanediol | Crystal Growth Regulator | 0.2 g |

The $H_2SO_4$ was added to the distilled water and was stirred until the solution cooled to room temperature. An aqueous solution (100 ml) of lecithin, butanediol and EDTA was added to the $H_2SO_4$ solution, resulting in the electrolyte solution. The electrolyte solution had a density of approximately 1.30 g/cm$^3$, at 25° C.

The electrolyte solution was loaded into an ES5LBS battery according to the invention. The battery energy and capacity were measured. The battery energy was found to be 56.577 Wh, and the capacity was found to be 4.5454 Ah. The performance of the battery was compared to the performance of a commercial ES5LBS battery with an electrolyte comprising 760 mL distilled water and 306 mL $H_2SO_4$ (98% by weight, density=1.84 g/ml) having a published energy of 48 Wh and capacity of 4 Ah (EverStart Premium Power Sport Battery). The battery of Example 2 demonstrated 31.42% more energy and 24.6% more capacity than the commercial ES5LBS battery.

Example 2 demonstrates that a sulfuric acid efficiency electrolyte of the invention results in an increase in the energy and capacitance of a lead-acid battery compared to a battery comprising an electrolyte that does not include any of a chelating agent, a surfactant, or a crystal growth regulator.

Example 3

An electrolyte was prepared with the ingredients identified below in the amounts shown.

| Component | Function | Amount |
| --- | --- | --- |
| Distilled water | Solvent | 750 ml |
| $H_2SO_4$ (98% by weight; d = 1.84 g/ml) | Sulfate source | 306 ml |
| EDTA | Chelating agent | 3 g |
| Ammonia (28% Ammonium Hydroxide solution) | Solvent | 6 ml |
| EDTA-Li$_2$ | Chelating agent, lithium source | 3 g |
| LiOH | Hydroxide and lithium source | 1 g |
| KOH | Hydroxide and potassium source | 1.5 g |
| Lecithin | Amphoteric surfactant | 0.5 g |
| 1,4-Butanediol | Crystal Growth Regulator | 0.1 g |

The $H_2SO_4$ was added to the distilled water and was stirred until the solution cooled to room temperature. In a separate container, the EDTA and EDTA-Li$_2$ were dissolved in the ammonia. The lecithin, butanediol, LiOH, and KOH were added to the EDTA/ammonia mixture, while being stirred. The EDTA mixture was diluted to 100 ml with additional distilled water. The EDTA mixture was then added to the $H_2SO_4$ solution, resulting in the electrolyte solution. The electrolyte solution had a density of approximately 1.33-1.38 g/cm$^3$, at 25° C.

The electrolyte solution was loaded into an ES5LBS battery according to the invention. The battery energy and capacity were measured. The battery energy was found to be 63.083 Wh, and the capacity was found to be 4.983 Ah. The performance of the battery was compared to the performance of a commercial ES5LBS battery with an electrolyte comprising 750 mL distilled water and 306 mL $H_2SO_4$ (98% by weight, density=1.84 g/ml) having a published energy of 48 Wh and capacity of 4 Ah (EverStart Premium Power Sport Battery). The battery of Example 3 demonstrated 14.3% more energy than the commercial ES5LBS battery.

Example 3 demonstrates that a sulfuric acid efficiency electrolyte of the invention results in an increase in the energy of a lead-acid battery compared to a battery comprising an electrolyte that does not include any of a chelating agent, a surfactant, or a crystal growth regulator. Example 3 further demonstrates that the inclusion of lithium and potassium cations in the electrolyte leads to a decrease, relative to Example 2, in the energy and capacitance of the resulting battery.

Example 4

An electrolyte was prepared with the ingredients identified below in the amounts shown.

| Component | Function | Amount |
| --- | --- | --- |
| Distilled water | Solvent | 750 ml |
| $H_2SO_4$ (98% by weight; d = 1.84 g/ml) | Sulfate source | 306 ml |
| EDTA | Chelating agent | 3 g |
| Ammonia (28% Ammonium Hydroxide solution) | Solvent | 6 ml |
| EDTA-K$_2$ | Chelating agent, potassium source | 3 g |
| LiOH | Hydroxide and lithium source | 1 g |
| KOH | Hydroxide and potassium source | 1.5 g |
| Lecithin | Amphoteric surfactant | 0.5 g |
| 1,4-Butanediol | Crystal Growth Regulator | 0.1 g |

The $H_2SO_4$ was added to the distilled water and was stirred until the solution cooled to room temperature. In a separate container, the EDTA and EDTA-K$_2$ were dissolved in the ammonia. The lecithin, butanediol, LiOH, and KOH were added to the EDTA/ammonia mixture, while being stirred. The EDTA mixture was diluted to 100 ml with additional distilled water. The EDTA mixture was then added to the $H_2SO_4$ solution, resulting in the electrolyte solution. The electrolyte solution had a density of approximately 1.30-1.35 g/cm³, at 25° C.

The electrolyte solution was loaded into an ES5LBS battery of the invention. The battery energy and capacity were measured. The battery energy was found to be 58.491 Wh, and the capacity was found to be 4.5078 Ah. The performance of the battery was compared to the performance of a commercial ES5LBS battery with an electrolyte comprising 600 mL distilled water and 300 mL $H_2SO_4$ (98% by weight, density=1.84 g/ml) having a published energy of 48 Wh and capacity of 4 Ah (EverStart Premium Power Sport Battery). The battery of Example 4 demonstrated 17.9% more energy than the ES5LBS battery.

Example 4 demonstrates that a sulfuric acid efficiency electrolyte of the invention results in an increase in the energy of a lead-acid battery compared to a battery comprising an electrolyte that does not include any of a chelating agent, a surfactant, or a crystal growth regulator. Example 4 further demonstrates that the inclusion of lithium and potassium cations in the electrolyte leads to a decrease, relative to Example 2, in the energy and capacitance of the resulting battery.

Example 5

An electrolyte was prepared with the ingredients identified below in the amounts shown.

| Component | Function | Amount |
|---|---|---|
| Distilled water | Solvent | 750 ml |
| $H_2SO_4$ (98% by weight; d = 1.84 g/ml) | Sulfate source | 306 ml |
| $H_3PO_4$ | Phosphoric Acid | 9.5 ml |
| EDTA | Chelating agent | 1.5 g |

The $H_2SO_4$ and $H_3PO_4$ were added to the distilled water and the solution was stirred until the solution cooled to room temperature. An aqueous solution (100 ml) of EDTA was then added to the $H_2SO_4$ solution, resulting in the electrolyte solution. The electrolyte solution had a density of approximately 1.33-1.38 g/cm³, at 25° C.

The electrolyte solution was loaded into an ES5LBS battery according to the invention. The battery energy and capacity were measured. The battery energy was found to be 61.731 Wh, and the capacity was found to be 5.0788 Ah. The performance of the battery was compared to the performance of a commercial ES5LBS battery with an electrolyte comprising 740 mL distilled water and 306 mL $H_2SO_4$ (98% by weight, density=1.84 g/ml) having a published energy of 48 Wh and capacity of 4 Ah (EverStart Premium Power Sport Battery). The battery of Example 6 demonstrated 28.6% more energy and 26.97% more capacity than the ES5LBS battery.

Example 5 demonstrates that a sulfuric acid efficiency electrolyte of the invention results in an increase in the energy and capacitance of a lead-acid battery compared to a battery comprising an electrolyte that does not include any of a chelating agent, a surfactant, or a crystal growth regulator.

Example 6

An electrolyte was prepared with the ingredients identified below in the amounts shown.

| Component | Function | Amount |
|---|---|---|
| Distilled water | Solvent | 761 ml |
| $H_2SO_4$ (98% by weight; d = 1.84 g/ml) | Sulfate source | 306 ml |
| Lecithin | Amphoteric surfactant | 0.5 g |
| 1,4-Butanediol | Crystal Growth Regulator | 0.1 g |

The $H_2SO_4$ was added to the distilled water and was stirred until the solution cooled to room temperature. An aqueous solution (100 ml) of lecithin and butanediol was then added to the $H_2SO_4$ solution, resulting in the electrolyte solution. The electrolyte solution had a density of approximately 1.3 g/cm³, at 25° C.

The electrolyte solution was loaded into an ES5LBS battery of the invention. The battery energy and capacity were measured. The battery energy was found to be 50 Wh, and the capacity was found to be 4.177 Ah. The performance of the battery was compared to the performance of a commercial ES5LBS battery with an electrolyte comprising 760 mL distilled water and 306 mL $H_2SO_4$ (98% by weight, density=1.84 g/ml) having a published energy of 48 Wh and capacity of 4 Ah (EverStart Premium Power Sport Battery). The battery of Example 6 demonstrated 15.8% more energy than the commercial ES5LBS battery.

Example 6 demonstrates that a battery comprising an electrolyte solution that includes an amphoteric surfactant and a crystal growth regulator demonstrates improved energy relative to a lead-acid battery compared to a battery comprising an electrolyte that does not include any of a surfactant, a chelating agent, or a crystal growth regulator.

Example 7

An electrolyte was prepared with the ingredients identified below in the amounts shown.

| Component | Function | Amount |
|---|---|---|
| Distilled water | Solvent | 757 ml |
| $H_2SO_4$ (98% by weight; d = 1.84 g/ml) | Sulfate source | 306 ml |
| EDTA | Chelating agent | 1.5 g |
| Ammonia (28% Ammonium Hydroxide solution) | Solvent | 2 ml |
| Triton X-100 | Non-ionic surfactant | 0.5 g |
| 1,4-Butanediol | Crystal Growth Regulator | 0.1 g |

The $H_2SO_4$ was added to the distilled water and was stirred until the solution cooled to room temperature. In a separate container, the EDTA was dissolved in the ammonia. The surfactant and butanediol were added to the EDTA/ammonia mixture, while being stirred. The EDTA mixture was diluted to 100 ml with additional distilled water. The EDTA mixture was then added to the $H_2SO_4$ solution, resulting in the electrolyte solution. The electrolyte solution had a density of approximately 1.30 g/cm³, at 25° C.

The electrolyte solution was loaded into an ES5LBS battery of the invention. The battery energy and capacity were measured. The battery energy was found to be 55.972 Wh, and the capacity was found to be 4.5287 Ah. The performance of the battery was compared to the performance of a commercial ES5LBS battery with an electrolyte comprising 740 mL distilled water and 306 mL $H_2SO_4$ (98% by weight, density=1.84 g/ml) having a published energy of 48 Wh and capacity of 4 Ah (EverStart Premium Power Sport Battery). The battery of Example 7 demonstrated 16.6% more energy and 13.2% more capacity than the ES5LBS battery.

Example 7 demonstrates that a sulfuric acid efficiency electrolyte of the invention results in an increase in the energy and capacitance of a lead-acid battery compared to a battery comprising an electrolyte that does not include any of a surfactant, a chelating agent or a crystal growth regulator.

Comparative Example 8

An electrolyte was prepared with the ingredients identified below in the amounts shown.

| Component | Function | Amount |
|---|---|---|
| Distilled water | Solvent | 761 ml |
| $H_2SO_4$ (98% by weight; d = 1.83 g/ml) | Sulfate source | 306 ml |

The $H_2SO_4$ was added to the distilled water and was stirred until the solution cooled to room temperature. The electrolyte solution had a density of approximately 1.30 g/cm$^3$, at 25° C.

The electrolyte solution was loaded into an ES5LBS battery. The battery energy was 48.86 Wh, and the capacity was 4.22 Ah. The performance of the battery was compared to the performance of a commercial ES5LBS battery with an electrolyte comprising 760 mL distilled water and 306 mL $H_2SO_4$ (98% by weight, density=1.84 g/ml) having a published energy of 48 Wh and capacity of 4 Ah (EverStart Premium Power Sport Battery).

Comparative Example 8 shows that the energy and capacity of a battery including an electrolyte freshly prepared corresponds well to the published value for a battery comprising the same electrolyte composition.

Comparative Example 9

The electrolyte from a commercially available 12V EverStart® ES5LBS battery (EverStart Premium Power Sport Battery) was tested in the same way as the batteries described examples 1-8. The electrolyte had a density of 1.33 g/cm$^3$, at 25° C., an energy of 50.786 Wh (5.8% more than the value published in the EverStart premium power sport battery owner's manual), and a capacity of 4.26 Ah (6.4% more than the value published in the EverStart premium power sport battery owner's manual.)

Comparative Example 10 shows that batteries comprising electrolytes of the invention demonstrate an increase in energy, and often capacitance, over the actual energy and capacitance of a commercial battery, as well as an increase over the published values for the same commercial battery.

Example 10

An electrolyte of the invention comprising EDTA, the lithium, potassium, and sodium salts of EDTA (in a 2:3:1 ratio by weight), lithium sulfate, potassium sulfate, and sodium sulfate (in a 2:3:1 ratio by weight) and polyacrylamide powder, the electrolyte having a density of 1.33 g/cm$^3$, at 25° C., was tested with a 12V EverStart® ES5LBS battery sold by Wal-Mart® stores and distributed by Johnson Controls Battery Group, Inc (Milwaukee, Wis. made in Taiwan) ("the distributor"). The distributor rates this battery at 4 Ampere-hours. The modified battery was coupled to a 17.3Ω load. The following measurements were continuously collected over a seven-hour period: (i) voltage across the load, (ii) current flowing through the load, (iii) the energy of the battery as measured in Watt-hours since the moment the load was coupled to the battery, and (iv) the capacity of the battery as measured in Ampere-hours. The measurements were collected using a WT/210 Power Analyzer manufactured by Yokogawa Electric Corporation headquartered in Tokyo, Japan.

The voltage across the load (and the modified battery) dropped to 10.5V after approximately seven hours of continuous operation. Without modifications, the voltage across a commercially available ES5LBS battery including a conventional sulfuric acid electrolyte (EverStart Premium Power Sport Battery) with a 17.3Ω load drops to 10.5V after approximately five hours of continuous operation.

The battery energy was found to be 67.595 Wh, and the capacity was found to be 5.5233 Ah after 7 hours of operation. The corresponding commercially available ES5LBS battery had an energy of 48 Wh and capacity of 4 Ah (EverStart Premium Power Sport Battery). The battery of Example 11 demonstrated 40.8% more energy and 38.08% more capacity than the ES5LBS battery.

Example 10 shows that batteries comprising electrolytes of the invention demonstrate an increase in energy and capacitance, over the actual energy and capacitance of a commercial battery.

Example 11

An electrolyte of the invention comprising EDTA, the lithium and potassium, salts of EDTA (in a 2:3 ratio by weight), lithium and potassium sulfate (in a 2:3 ratio by weight) and polyacrylamide powder, the electrolyte having a density of about 1.28 g/cm$^3$, at 25° C., was deposited into a spent (i.e., no longer usable for the intended applications) 18-cell, 2.2 electrolyte gallon/cell lift battery. A new battery of this type is rated at 875 Ah. Batteries of this type typically are used in forklifts and similar applications.

A control test was conducted by drawing a 145.83 A current from the spent lift battery for six hours. The remaining capacity of the spent lift battery was measured to be 584.39 Ah, or 66.79% of the original capacity. After the additive of the invention was deposited into the spent lift battery, a 145.83 A current was drawn from the battery for six hours. The capacity of the spent lift battery with the additive was determined to be 776.86 Ah, or 88.76% of the original capacity.

The battery was again tested 5 days later by drawing a 145.83 A current from the spent lift battery for six hours. The capacity of the spent lift battery with the additive was determined to be 873.09 Ah, or 96.58% of the original capacity.

Example 11 shows that spent batteries comprising the electrolyte of the invention demonstrate an increase in capacity over the capacitance of a spent battery that does not comprise the electrolyte of the invention. Example 12 also shows that the electrolyte of the invention can be used in spent batteries to revive a spent battery and provide an acceptable battery for industrial applications.

What is claimed:

1. A sulfuric acid efficiency electrolyte, comprising: sulfuric acid, a filler, at least one chelating agent, and at least one water-soluble sulfate salt.

2. The electrolyte of claim 1, wherein the filler comprises polyacrylamide, the chelating agent comprises $Li_2EDTA$, and the water-soluble sulfate salt comprises $Li_2SO_4$.

3. The electrolyte of claim 2, wherein the chelating agent further comprises $K_2EDTA$ and the water-soluble sulfate salt comprises $K_2SO_4$.

4. The electrolyte of claim 3, wherein the chelating agent further comprises $Na_2EDTA$ and the water-soluble sulfate salt further comprises $Na_2SO_4$.

5. The electrolyte of claim 4, wherein lithium, potassium, and sodium cations are present in a ratio of about 2:3:1, respectively.

6. The electrolyte of claim 4, wherein the lithium cation is included in the electrolyte in an amount of about 0.001 to about 0.15 mol/L.

7. The electrolyte of claim 6, wherein the potassium cation is included in the electrolyte in an amount of about 0.001 to about 0.05 mol/L.

8. The electrolyte of claim 7, wherein the sodium cation is included in the electrolyte in an amount of about 0.025 to about 0.05 mol/L.

9. The electrolyte of claim 3, wherein lithium and potassium cations are present in a ratio of 2:3, respectively.

10. The electrolyte of claim 1, wherein the at least one chelating agent is selected from the group consisting of ethylenediaminetetraacetic acid (EDTA), a salt thereof, and combinations of the foregoing.

11. The electrolyte of claim 10, wherein the EDTA salt is selected from the group consisting of the lithium salt, the potassium salt, the sodium salt, and combinations of the foregoing.

12. The electrolyte of claim 1, wherein the filler is selected from the group consisting of $SiO_2$, SiC, polyacrylamide, polyvinyl alcohol, non-conductive nanocarbon particles and combinations of the foregoing.

13. The electrolyte of claim 1, further comprising phosphoric acid.

14. A lead sulfuric acid battery with a sulfuric acid efficiency electrolyte, comprising:
 a positive electrode;
 a negative electrode; and
 an electrolyte disposed between the positive electrode and the negative electrode, wherein the electrolyte comprises the electrolyte of claim 1.

* * * * *